Nov. 23, 1926.
E. F. HIGGINS
1,607,622
IMITATION MOTHER-OF-PEARL AND PROCESS OF MAKING THE SAME
Filed Jan. 14, 1922
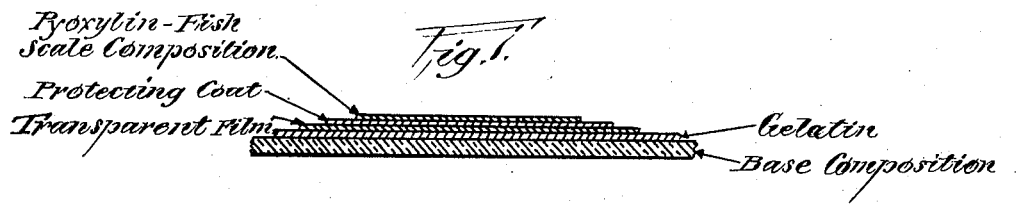
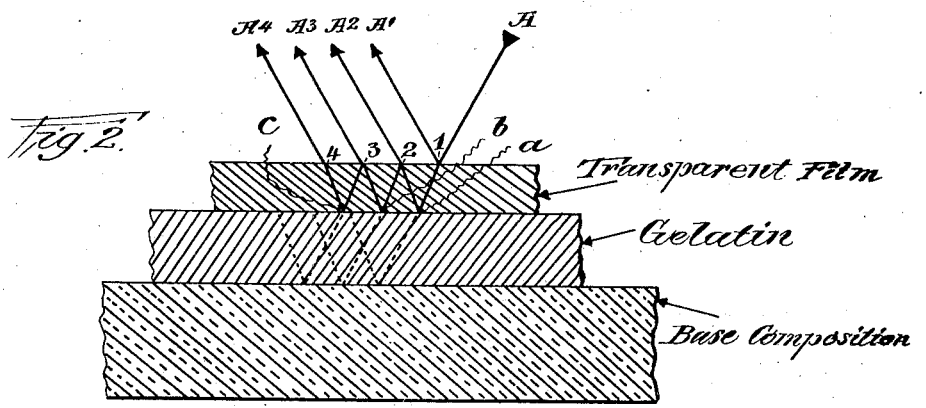
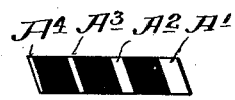
INVENTOR
Edward F. Higgins
BY his ATTORNEYS
Darby & Darby Patented Nov. 23, 1926.

1,607,622

UNITED STATES PATENT OFFICE.

EDWARD F. HIGGINS, OF BROOKLYN, NEW YORK, ASSIGNOR TO JOSEPH H. MEYER BROS. INC., OF NEW YORK, N. Y., A CORPORATION OF NEW YORK.

IMITATION MOTHER-OF-PEARL AND PROCESS OF MAKING THE SAME.

Application filed January 14, 1922. Serial No. 529,246.

This invention relates to the manufacture of imitation mother-of-pearl.

The object of the invention is to produce a substance in imitation of mother-of-pearl, which possesses the characteristic iridescence of genuine mother-of-pearl.

A further object of the invention is to provide an imitation mother-of-pearl of the character referred to wherein the iridescence is obtained, as in the case of genuine mother-of-pearl, by resolving light rays into their prismatic colors, and without employment of pigments or other coloring matter.

A further object of the invention is to produce an imitation of the diffused sheen effects of genuine mother-of-pearl.

A further object is to produce iridescent effects in substances or bodies which can be employed in the manufacture of articles of commerce, and wherein such effects are obtained in such substances or bodies in a manner similar to the natural production thereof in genuine mother-of-pearl.

A further object is to combine, in substances or bodies suitable for use in the manufacture of articles of commerce, the iridescence of genuine mother-of-pearl and the diffused sheen effects in imitation of genuine mother-of-pearl.

Other objects of the invention will appear more fully hereinafter.

The invention consists substantially in the mode of operation and product as hereinafter more fully set forth, as explained in connection with the accompanying drawing, and finally pointed out in the appended claims.

Various attempts have been made to produce artificially iridescent effects and play of changeable colors by the employment of pigments and other coloring matter, but without success in really producing an iridescent effect approaching that of the genuine mother-of-pearl.

It has also been attempted to produce a diffused effect in plastic bodies or substances, but, so far as I am aware, such efforts have failed to attain a satisfactory degree of success in producing a diffused sheen effect approaching that of genuine mother-of-pearl, and, so far as I am aware, no attempt has heretofore been made to secure the iridescent effects of genuine mother-of-pearl, and to fix and stabilize the same in a form or body or substance to permit the practical use thereof in the manufacture of articles of commerce, nor to combine the same with an imitation of the diffused sheen effects of mother-of-pearl, whereby there may be imparted to such articles of commerce a close semblance in effect and appearance to genuine mother-of-pearl.

In carrying out my invention I propose to produce in a suitable body or substance the iridescent effects of genuine mother-of-pearl, in a fixed and stabilized manner, and in the same way such effects are produced in the genuine article. I also propose to produce a body or substance having a diffused sheen effect in imitation of mother-of-pearl, and I then propose to combine the two bodies, or effects, so as to produce an imitation of mother-of-pearl. It is among the special purposes of my present invention to accomplish these results economically and in a practical and commercially useful manner in the manufacture of various articles such as boxes, trays, combs, handles for various instruments, mirror and brush backs, or the like, in fact, any article capable of being made from plastic material.

The invention is carried out in stages, in one of which the iridescent effect is attained, in another of which the diffused sheen effect is attained, and in another of which the two effects are combined and associated to produce the imitation of mother-of-pearl product, which, as above indicated, may be incorporated into various articles of commerce.

In carrying out the stage of producing the iridescent effect, in accordance with my invention I employ an exceedingly thin transparent film of suitable material. I have found that such a transparent film may be produced from a solution of the esters of cellulose, such as the nitrate, or the acetate. I do not desire, however, to be limited or restricted to the use of the esters of cellulose for this purpose, as a suitable thin transparent film may also be obtained in the form of a solution of resins such as dammar, shellac, mastic, or the like. It is important that the solvent element of the solution should be of such nature as to be volatile, and also of such nature as to exert no solvent or chemical action on the surface or body of material to which the thin transparent film is to be applied. In this connection I have found that amyl acetate, acetone or other ketonic combination, alcohol-ether, diacetonealcohol, and the like, are suitable solvents for use in connection with esters of cellulose in the production of a solution to be employed in accordance with my invention, and for resins I have found that fusel oil, alcohol, benzene, or the like, are suitable solvents to be employed. In order to obtain an exceedingly thin transparent film, I have found it desirable that the solution should contain only a very small amount of solid matter. I have found in the case of a solution of the esters of cellulose, for example, that approximately one per cent of solid matter in the solution is sufficient. I do not desire, however, to be limited in this respect. When proper precaution is observed in respect to the character of solvent and solid matter and relative proportion of the latter, the application of the solution to the surface of suitable material, after being treated as will be hereinafter more fully described, leaves, on evaporation of the solvent of said solution, a smooth, transparent, extremely thin film. This solution may be applied in various ways either by flowing the same over the surface to which it is to be applied, or spraying the same thereon, or by immersion, or otherwise. As the solvent employed in the solution evaporates, the iridescent colors begin to appear.

Such a thin transparent film alone is too delicate and frangible to permit of being handled or to be of commercial utility, and, therefore, in accordance with my invention, I propose to fix and stabilize the same so as to secure the iridescent effects produced in a permanent form, capable of commercial utility in the industrial arts. This I accomplish by specially preparing the base body to which the thin transparent film is applied, and also by suitably protecting the surface of the film from injury.

For a base body I preferably employ a suitable plastic material, whether translucent, transparent or opaque. I have found a pyroxylin compound, such as celluloid, suitable for the purpose. I do not desire, however, to be limited or restricted to the use of celluloid or other pyroxylin compound, as any well known substitute therefor, such as the products known commercially as casein, satowlite, or the like, affords an excellent equivalent. This plastic material is employed in any desired form, whether as a mass, in the form of a sheet, or in the basic form of an article of manufacture. For some ultimate uses a plastic material which is transparent is better. For other uses transparency may not be essential. I will refer to this plastic material as a base body, intending thereby to include a plastic material of the nature referred to, or its equivalent, whether in mass or in sheet form, or in the form of a fashioned or shaped article of manufacture.

The surface of the base body is then polished to a sufficiently high degree to render the same capable of reflecting light impinging thereon. Upon the polished surface of the base body is applied or deposited in any suitable manner a thin layer of material which is immiscible with the material of the base body. I have found that a thin film of gelatin answers the purpose, although my invention is not to be limited in this respect as other materials may be employed, such as agar-agar, gum arabic, or the like. A convenient way of applying this layer is to deposit the same from an aqueous solution.

After the layer of gelatin or other material has dried thoroughly, the surface thereof is polished. For this purpose I propose to employ a basic halogen salt of bismuth, such as oxychloride, oxybromide, or oxyiodide of bismuth. This halogen salt of bismuth in the form of a dry powder may be applied over the surface of the gelatin layer in any suitable or convenient manner. I have found it satisfactory to apply the salt with a soft rag, chamois, or the like. Apparently this operation not only levels, smooths and polishes the surface of the layer of gelatin or other material, but the minute cells, pores or recesses present in the layer structure or body become filled up with the halogen salt of bismuth employed, leaving the surface of the layer of gelatin or other material extremely brilliant. This also materially aids in rendering the gelatin non-permeable to the solvent of the thin transparent film when the latter is applied thereto. To this brilliant polished surface of the gelatin layer the thin transparent film, hereinbefore described, is applied in the manner set forth.

The outer surface of the thin transparent film after being applied to the surface of the layer of gelatin, or other material, is then carefully polished with one or another of the basic halogen salts of bismuth. This operation fills up or reduces any porosity in the surface of the thin transparent film, and renders such surface very brilliant, and hence more highly capable of reflecting light therefrom. This is important as apparently it serves to intensify the color effect produced. This operation also renders the thin transparent film surface non-permeable when a fixing and protecting coating is applied to the surface thereof. It also serves to effect a more perfect light reflection and interference effect, modifying the dispersion of colors through the blending thereof with white light reflected from its own surface and resulting interference caused by such reflection of white light with the prismatic refracted light rays.

The next operation is to apply a protective or fixing coating to the surface of the transparent film. The object of this operation is to protect against injury the thin transparent film, which is exceedingly fragile and very easily breakable. A coating of material which is immiscible with the material of the transparent film should be used for the protecting coating. I have found that a coating of gelatin deposited from an aqueous solution thereof will answer the purpose. If desired, the surface of this protecting coating of gelatin may in turn be protected, as, for instance, by hardening the same, or rendering it insoluble. This may be accomplished in many different ways. I have found that the desired result may be accomplished by subjecting the surface of the protecting coating of gelatin to the action of formaldehyde vapors, or by dipping the same into a weak solution of formaldehyde, or the desired results may be attained by applying to the surface of the protecting film a thin coating of lacquer or varnish. This completes the stage of producing the iridescent effects in a fixed and stabilized condition capable of being utilized commercially.

The resulting product, as above explained, may be either a composite sheet, which can be stamped or blanked out into sections to be incorporated into any desired article of manufacture, or the operations above described may be carried out upon a mass of original plastic material which itself has been formed into the required shape to make an article of manufacture.

The end product of this stage of operation employed in carrying out my invention presents a beautiful effect of blended, variegated and changeable colors which vary or change as the surface is turned or shifted in the light to which it is subjected. This is the beautiful iridescent effect of genuine mother-of-pearl.

An important characteristic of this product is that no pigment or coloring matter is employed, the iridescence or changeable color effects being obtained solely from the effects of light reflection and refraction, the intensification of such reflection and refraction, and the interference of the reflected and refracted rays.

I will now describe the stage of producing the imitation mother-of-pearl diffused or sheen effect, which is to be combined with the iridescent effect produced as above described. For this purpose the dehydrated pigment obtained from fish scales in the form of microscopically small particles presenting a brilliant silvery appearance, is suspended in a liquid which is miscible with plastic pyroxylin compounds, such, for instance, as celluloid. I have found that acetone or alcohol are suitable liquids within which such suspension of fish scale pigment may be effected. This liquid compound is mixed into a plastic pyroxylin compound preferably under heat and pressure. This can best be accomplished, according to present practice, by incorporating the suspended fish scale pigment into the pyroxylin compound dough during the manipulation of the latter in the process of its manufacture. I have found it preferable to introduce the suspended fish scale pigment at the very end of the rolling operation to which the plastic pyroxylin compound is subjected in the ordinary process of its manufacture. It is important to apply the minimum amount of rolling action to the plastic compound after the introduction of the fish scale pigment, in order to avoid altering or changing the delicate physical structure of the organic fish scale pigment. The application of heat to the plastic pyroxylin compound during the introduction of the fish scale pigment is also important, as it maintains the pyroxylin compound in a plastic condition, rendering it permeable to the liquid or vehicle carrying the fish scale pigment in suspension. The pressure exerted upon the plastic and softened pyroxylin compound causes the pigment to be forced into the body of the compound and dispersed indiscriminately therein. After the introduction and incorporation of the fish scale pigment into the body or mass of the plastic pyroxylin compound, the plastic material is carried through the ordinary remaining steps for producing celluloid, for example. The resulting product is characterized by the presence therein of irregular translucent streaks and blotches, presenting more or less of a mottled appearance imparting a diffused sheen remarkably like that of natural pearl shell.

The next operation in carrying out my invention is to combine the material possessing the imitation diffused sheen of pearl shell with the body to which has been imparted the iridescence of genuine mother-of-pearl. This can be accomplished in various ways. According to one method, the material having the diffused sheen effect may be employed and applied as a covering for the body which has been rendered iridescent, thereby obtaining the combined effects of the iridescence and diffusion. As above explained, the material which has been made iridescent may have been originally shaped in the form of the article of manufacture, and the iridescent effect produced on such a blank. In that case a sheet which has been given the diffused sheen appearance of pearl shell is correspondingly shaped and applied over the iridescent surface as a covering therefor.

Another way of utilizing the iridescent and sheen materials is to shape ordinary celluloid into the form of any desired article, then in-laying on its surface a sheet which has been rendered iridescent, and finally applying over the base as well as the inlay, a covering of material to which the diffused sheen effect has been imparted. It is to be understood, of course, that many other ways will readily occur to persons skilled in the art of combining and utilizing in the industries the bodies or substances which, respectively, have been rendered iridescent and given the diffused sheen effect as above described.

If desired, instead of employing the body containing the diffused sheen effect, in combination with the iridescent body, I may simply immerse the iridescent body in, or otherwise apply, a liquid solution capable of depositing a transparent film, to which solution has been added fish scale pigment, thereby securing the desired diffused sheen effect in imitation of mother-of-pearl.

The final product in any of the above illustrations is a composite body made up of an element employed as a core or base, so to speak, and which has been rendered beautifully iridescent, and a covering of fish scale—plastic composition which supplies the mother-of-pearl diffused sheen effect, producing in the blending and combining of these effects of iridescence and diffusion the beautiful appearance of natural mother-of-pearl.

In carrying out my invention, I am enabled to attain with facility and economy a body or substance in imitation mother-of-pearl, in which the iridescent effects are attained without the use of pigments or colors, but purely from the effects of light interference. I am enabled to obtain this result in a composition or body which is moldable, or otherwise workable, into any desired shape in the production of articles of manufacture. Any desired article capable of being made out of celluloid or plastic composition such as celluloid, may be produced in the use thereof. In this respect I produce an imitation mother-of-pearl which possesses very remarkable practical and commercial advantages over the real mother-of-pearl, in that the latter is necessarily fragile, while articles produced as above described are strongly resistant of injury through fracture or breaking. Moreover, articles to be produced from real mother-of-pearl are necessarily prescribed in size, whereas articles of any desired size, such as are ordinarily made out of pyroxylin compound, may be produced with materials such as I have described. I am thus enabled to produce articles of commerce in imitation of mother-of-pearl, and possessing remarkable fidelity of mother-of-pearl appearance, very easily and economically.

In the accompanying drawing, I have shown in Fig. 1 an illustrative example of the product according to my invention. In Fig. 2 I have indicated the method of obtaining the iridescent effect through the interference of light waves. In Fig. 3 I have indicated graphically the action obtained from a monochromatic light ray.

To further explain the action involved in the production of the iridescent effect, referring to Fig. 2, let us suppose A to indicate a source of monochromatic light, say, yellow. At the point 1, where this light impinges upon the surface of the thin transparent film, a part of the yellow rays are reflected from the upper surface of the film, as indicated at $A^1$, and the remainder pass on through the thin film, undergoing refraction in such passage. Of such refracted rays a portion are reflected from the lower surface of the film at the point $a$, back through the film, and a portion of these rays emerging at the point 2 from the upper surface of the film as indicated at $A^2$. Only a portion of the rays are reflected at the point $a$, the unreflected portion emerging from the lower surface of the film and pass on through the gelatin layer and are possibly subjected to other refractions and reflections, as indicated by the dotted lines until finally dissipated, but such further reflections and refractions are of such reduced intensities that they may be disregarded. At the point 2 a portion of the rays emerge, as indicated at $A^2$, while the remaining portion of reduced intensity is again reflected back through the film, to the point $b$. Here again occurs a partial reflection to the point 3, and a partial emergence at $b$ as indicated by the dotted lines. At the point 3, a portion emerges as indicated at $A^3$, while a portion is again reflected through the film to the point $c$, where reflection and emergence again take place, the reflection being to point 4, where emergence, as indicated at $A^4$, takes place, and also reflection as before, and so on, each succeeding emergence $A^1$, $A^2$, $A^3$, $A^4$, &c., being of reduced intensity, and appearing as bands of yellow light, in the instance referred to as illustrative of the operation, as graphically indicated in Fig. 3, the bands $A^1$, $A^2$, $A^3$, $A^4$, &c., corresponding to the rays $A^1$, $A^2$, $A^3$, $A^4$, of Fig. 2, and separated from each other by spaces or bands which are black or which contain no light.

It will be seen that the rays $A^2$ have traveled a distance greater than that traveled by rays $A^1$ by about twice the thickness of the thin film; the rays $A^3$ by about four times the thickness of the film; the rays A⁴ about six times such thickness, and so on. Consequently each succeeding emerging ray A², A³, &c., is retarded not only with reference to the immediately preceding one, but also, in increasing amount with reference to the initial reflected ray A¹. If this retardation in the case of the ray A² is one-half the wave length of yellow light, or any odd number of half-wave lengths, and the point of emergence is close to the point of reflection 1, then the rays A¹ and A² will neutralize each other, and hence no light will be seen. This is what takes place in the production of the black bands intermediate the rays A¹, A², A³, &c., of Fig. 3. If, on the other hand, the retardation is equal to a whole wave length of yellow light, or two whole wave lengths, or any multiple of whole wave lengths, then the rays which emerge in close proximity will reinforce instead of neutralize each other, thereby intensifying the emerging rays, though, as above observed, the intensity of each succeeding ray A², A³, &c., is reduced for the reasons above pointed out. Now this rule of action obtains as to all the colors of the spectrum, and hence, where the initial incident light is, say, white light, or sun light, an iridescent effect is produced by the resulting interferences of the light waves of the resulting resolved rays, due to the retardation and action above described. This, it will be observed, is the manner in which the iridescent effects are produced in soap bubbles, the wings of some insects, and in genuine mother-of-pearl.

Thus it will be seen that in securing the iridescent effects, in accordance with my invention, I follow the same plan that nature has provided for genuine mother-of-pearl, and I attain the same results, though in a practical form capable of being utilized in the industrial arts.

The color effects obtained in accordance with my invention may be controlled and varied by varying the thickness of the thin transparent film, or by varying the thickness of the sheet or body or coating containing the imitation diffused sheen effect, or both.

Having now set forth the objects and nature of my invention, and the manner of carrying the same into practical and useful operation, what I claim as new and useful and of my own invention, is:—

1. In the manufacture of imitation mother-of-pearl, the process which consists in applying a thin transparent film to a light ray reflecting surface of a plastic material, and then applying to the film a plastic composition having fish scale pigment incorporated therein.

2. In the manufacture of imitation mother-of-pearl, the process which consists in applying to the surface of a base body a layer of material immiscible with said body, then applying a thin transparent film to the surface of said layer, then polishing with a bismuth salt the surface of and finally applying a protecting coating to the thin transparent film.

3. In the manufacture of imitation mother-of-pearl, the process which consists in applying a layer of gelatin to a base body, then polishing with a bismuth salt the surface of said gelatin, then applying a thin transparent film to the surface of said layer, and finally applying a protecting coating to the thin transparent film.

4. In the manufacture of imitation mother-of-pearl, the process which consists in polishing the surface of a base body, and applying to the polished surface a layer of material immiscible with such body, then polishing the surface of such layer with a bismuth salt and applying thereto a thin transparent film, and finally applying a protecting coating to the transparent film.

5. In the manufacture of imitation mother-of-pearl, the process which consists in polishing the surface of a base body, and applying to the polished surface a layer of material immiscible with such body, then polishing with a bismuth salt the surface of such layer and applying thereto a thin transparent film, and finally applying a protecting coating to the transparent film, and which is immiscible therewith.

6. In the manufacture of imitation mother-of-pearl, the process which consists in polishing the surface of a base body, and applying to the polished surface a layer of material immiscible with such body, then polishing with a bismuth salt the surface of such layer and applying thereto a thin transparent film, and finally applying a film of gelatin to the transparent film.

7. In the manufacture of imitation mother-of-pearl, the process which consists in polishing the surface of a base body, and applying to the polished surface a layer of material immiscible with such body, then polishing with a bismuth salt the surface of such layer and applying thereto a thin transparent film, and finally applying a film of gelatin to the transparent film and hardening the surface of the gelatin film.

8. In the manufacture of imitation mother-of-pearl, the process which consists in polishing the surface of a base body, and applying to the polished surface a layer of material immiscible with such body, then polishing with a bismuth salt the surface of such layer and applying thereto a thin transparent film, and finally applying a film of gelatin to the transparent film, and subjecting the surface of the gelatin film to the action of formaldehyde.

9. In the manufacture of imitation mother-of-pearl, the process which consists in polishing the surface of a base body, and applying to the polished surface a layer of material immiscible with such body, then polishing with a bismuth salt the surface of such layer and applying thereto a thin transparent film, and finally polishing the surface of the transparent film.

10. In the manufacture of imitation mother-of-pearl, the process which consists in polishing the surface of a base body, and applying to the polished surface a layer of material immiscible with such body, then polishing with a bismuth salt the surface of such layer and applying thereto a thin transparent film, and finally polishing and protecting the surface of the transparent film.

11. In the manufacture of imitation mother-of-pearl, the process which consists in polishing the surface of a base body, and applying to the polished surface a layer of material immiscible with such body, then polishing with a bismuth salt the surface of such layer and applying thereto a thin transparent film, and finally polishing the surface of the transparent film and applying a protecting coating thereto.

12. In the manufacture of imitation mother-of-pearl, the process which consists in polishing the surface of a base body, and applying to the polished surface a layer of material immiscible with such body, then polishing with a bismuth salt the surface of such layer and applying thereto a thin transparent film, and finally polishing the surface of the transparent film and applying a protecting coating of gelatin thereto.

13. In the manufacture of imitation mother-of-pearl, the process which consists in polishing the surface of a base body, and applying to the polished surface a layer of material immiscible with such body, then polishing with a bismuth salt the surface of such layer and applying thereto a solution of esters of cellulose.

14. In the manufacture of imitation mother-of-pearl, the process which consists in polishing the surface of a base body, and applying to the polished surface a layer of material immiscible with such body, then polishing with a bismuth salt the surface of such layer and applying thereto a solution of esters of cellulose, the solvent of which is volatile and exerts no action on the surface or body to which the solution is applied.

15. In the manufacture of imitation mother-of-pearl, the process which consists in polishing the surface of a base body, and applying to the polished surface a layer of material immiscible with such body, then polishing with a bismuth salt the surface of such layer and applying thereto a solution of esters of cellulose in a volatile ketonic solvent.

16. In the manufacture of imitation mother-of-pearl, the process which consists in polishing the surface of a base body, and applying to the polished surface a layer of material immiscible with such body, then polishing with a bismuth salt the surface of such layer and applying thereto a solution of esters of cellulose, and finally applying a gelatin film to the thin transparent film.

17. In the manufacture of imitation mother-of-pearl, the process which consists in polishing the surface of a base material, then applying to the polished surface thereof a thin layer of material immiscible therewith, then polishing the surface of said layer with a basic halogen salt of bismuth, and finally applying a thin transparent film to the polished surface of the layer.

18. In the manufacture of imitation mother-of-pearl, the process which consists in polishing the surface of a sub-plastic material, then applying to the polished surface thereof a thin layer of material immiscible therewith, then polishing the surface of said layer with a basic halogen salt of bismuth, and finally applying a thin transparent film to the polished surface of the layer.

19. In the manufacture of imitation mother-of-pearl, the process which consists in polishing the surface of a base material, then applying to the polished surface thereof a thin layer of gelatin, then polishing the surface of said gelatin layer with a basic halogen salt of bismuth, and finally applying a thin transparent film to the polished surface of the gelatin layer.

20. In the manufacture of imitation mother-of-pearl, the process which consists in polishing the surface of a base material, then applying to the polished surface thereof a thin layer of material immiscible therewith, then polishing the surface of said layer with a basic halogen salt of bismuth, and finally applying a thin transparent film to the polished surface of the layer and protecting said thin transparent film with a gelatin coating.

21. As a new article of manufacture in imitation of mother-of-pearl, a composite body including a thin transparent film having the property of producing interference of light rays, and a covering material containing the pigment of fish scales.

22. As a new article of manufacture in imitation of mother-of-pearl, a stable composite body formed of plastic material combining therein the effects of iridescence of genuine mother-of-pearl and a diffused sheen in imitation of mother-of-pearl.

In testimony whereof I have hereunto set my hand on this 11th day of January A. D., 1922.

EDWARD F. HIGGINS.